No. 725,140. PATENTED APR. 14, 1903.
J. G. ROBERTS.
DEVICE FOR MAINTAINING CONSTANT SPEED IN ELECTRIC MOTORS.
APPLICATION FILED JAN. 2, 1902.
NO MODEL.
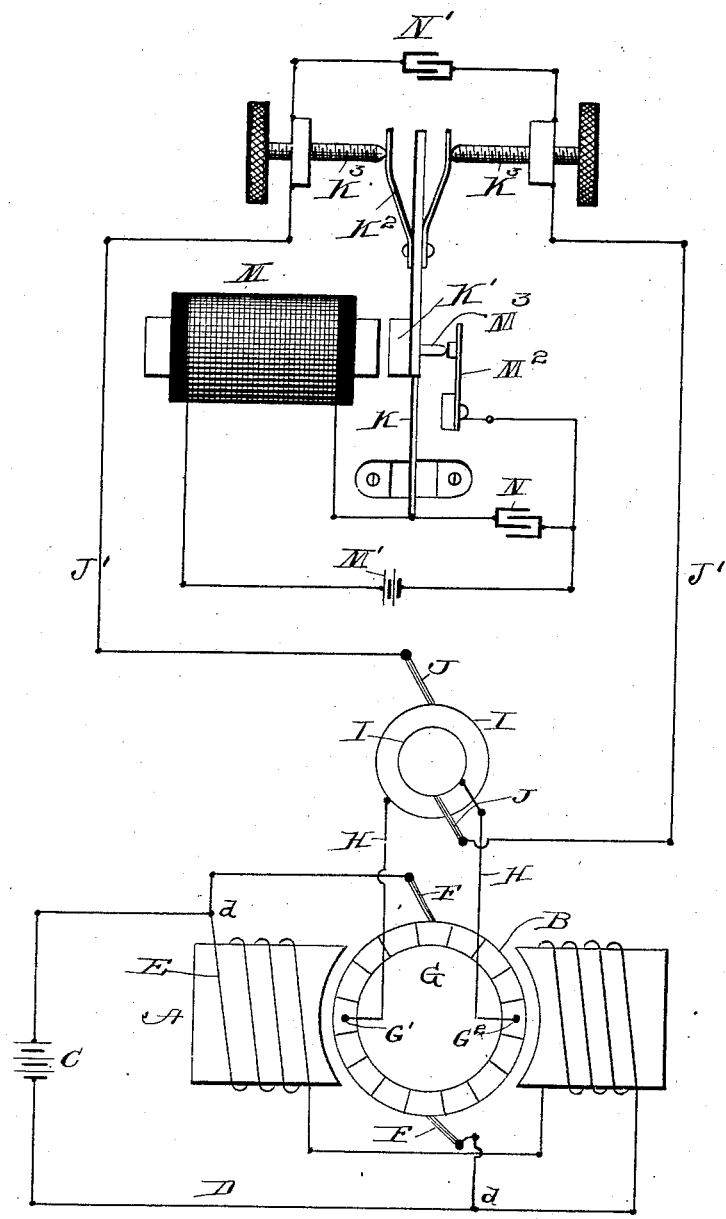
Witnesses:
J. M. Fowler Jr.
F. T. Chapman.
Inventor:
John G. Roberts,
By Lyon & Bussing
Attys.

UNITED STATES PATENT OFFICE.

JOHN G. ROBERTS, OF DETROIT, MICHIGAN, ASSIGNOR TO HARRY J. FOX, TRUSTEE, OF DETROIT, MICHIGAN.

DEVICE FOR MAINTAINING CONSTANT SPEED IN ELECTRIC MOTORS.

SPECIFICATION forming part of Letters Patent No. 725,140, dated April 14, 1903.

Application filed January 2, 1902. Serial No. 88,245. (No model.)

*To all whom it may concern:*

Be it known that I, JOHN G. ROBERTS, a citizen of the United States, and a resident of Detroit, in the county of Wayne and State of Michigan, have invented certain new and useful Improvements in Devices for Maintaining Constant Speed in Electric Motors, of which the following is a specification.

The object of my invention is to synchronize or rather to secure a constant and unvarying speed for direct-current electric motors of the ordinary type. Such motors when possessing an unvarying speed are manifestly useful for various purposes. They may, for instance, be used to drive electrical transmitters, facsimile-telegraphs, and other apparatuses when uniform motion is necessary or desirable. The particular use to which the motor is put, however, comprises no part of my invention.

Briefly stated, my invention employs a direct-current motor of the ordinary type having an armature and field-winding. There is also a source of direct current for energizing and driving the motor in the usual manner.

Considering now one of the two elements of the motor, armature, or field—say the armature—I connect opposite points of the armature-windings in the following manner—that is, I connect wires to two opposite commutator-segments, and by means of rings and brushes on the armature-shaft or in any other suitable way I interpose a timed vibrator in the circuit thus formed to make and break the circuit any timed-required number of times. I have discovered that with such an arrangement the armature of the motor attains and maintains such speed as will make a complete revolution of the motor correspond to every two circuit-closing positions of the timed vibrator. Since the reason for this from an electrical standpoint is not certain, I do not undertake to give the theory of the operation.

In the drawing I have shown a diagram of my invention.

The direct-current motor consists of a field-magnet A and an armature B. The source C of direct current for feeding the motor may be a battery or other direct-current generator. The circuit D, leading to this motor from the source of direct current, branches at the point $d\ d$, one branch going through the field-winding E and the other branch going through the brushes F and the commutator-sections G. To two of these opposite commutator-sections $G'\ G^2$ are connected wires or taps H, leading to rings I on the motor-shaft, on which rings slide brushes J, connected to wires $J'\ J'$, thus continuing the circuit from the two opposite commutator-sections $G'\ G^2$ through the wires H, the rings I, and the brushes J to the wires $J'\ J'$. In this circuit last described there is inserted a timed vibrator, which serves to control or make and break the circuit. This vibrator may be of any desired construction and is shown as a common buzzer. It consists of a flat metal spring K, carrying armature $K'$ and contact-springs $K^2$, which coöperate with the adjustable screw-contacts $K^3$. When this spring K is in its middle position and both contact-springs $K^2$ are in contact with the contact-screws $K^3$, the circuit $G'\ H\ I\ J\ J'\ K^3\ K^2\ K^3\ J'\ J\ I\ H\ G^2$ is closed. In other words, when the spring K is in its middle position a short circuit is established between the two opposite commutator-plates $G'\ G^2$. When this spring K is thrown to either one side or the other, this short circuit is broken.

In order to vibrate the timed vibrator, I may use a common electromagnet M, whose circuit contains the battery $M'$ and passes through the fixed contact $M^2$ onto the movable contact $M^3$ on the spring K. When the spring K is in its position away from the magnet, the circuit of the battery $M'$ is closed through the contacts $M^2\ M^3$, and the magnet M being energized attracts its armature $K'$, thus breaking the circuit and allowing the armature to fly back to again close the circuit and to repeat the operation indefinitely. All this is well understood. So, too, I may use a condenser N in shunt about the breaks $M^2\ M^3$, and another condenser $N'$ about the breaks $K^2\ K^3$.

The motor and the timed vibrator are so constructed that the natural speed of the motor is about the same as the speed of the vibrator—that is to say, so that the motor-armature will make a complete revolution in the same time that the timed vibrator makes a complete vibration, it being understood that the circuit is closed across the screws K³ twice in this time.

I have found by experience that when the motor and the timed vibrator thus constructed and arranged are set into motion they immediately fall into synchronism and that the slightest departure of the motor from an absolutely synchronous movement, even though it cause the armature to move in advance of or to lag behind its normal march by the merest fraction of a revolution, will immediately bring into play counteracting forces, which will retard or speed up the motor, as may be necessary, to restore normal movement.

It will be understood that many types of timed vibrators, whether they be driven by clockwork, by electromagnets, or otherwise, may be used instead of the one shown by me, and also that I am not limited to the form of direct-current motor here shown, but may use other forms, the breadth of my claims being controlling in these particulars.

What I claim is—

1. A direct-current electric motor having a short circuit connecting opposite points of one of its windings, and a timed circuit-controller in the short circuit to keep the motor at uniform speed, substantially as described.

2. A direct-current electric-driven motor having a short circuit connecting opposite points of one of its windings, and a timed buzzer in the short circuit to keep the motor at uniform speed, substantially as described.

3. A direct-current electric motor having a short circuit connecting two of its commutator-segments and a timed circuit-controller in the short circuit to keep the motor at uniform speed, substantially as described.

4. An electrically-driven motor having two of its opposite commutator-segments connected to rings on the motor-shaft, brushes contacting with the rings, and a timed circuit-controller in the circuit of the brushes to periodically close a short circuit across the commutator-segments and thus keep the motor running at uniform speed, substantially as described.

5. An electrically-driven shunt-wound motor having a short circuit connecting opposite points of one of its windings, and a timed circuit-controller in the short circuit to keep the motor at uniform speed, substantially as described.

6. An electrically-driven shunt-wound motor having a short circuit connecting two of the commutator-segments of the armature and a timed circuit-controller in the short circuit to keep the motor at uniform speed, substantially as described.

In testimony whereof I have signed my name to this specification in the presence of two subscribing witnesses.

JOHN G. ROBERTS.

Witnesses:
   FREDERICK ROHNERT,
   CHAS. W. LAYCOCK.